Feb. 17, 1925.
J. SLEPIAN
1,526,382
SYNCHRONOUS DYNAMO ELECTRIC MACHINERY
Filed April 4, 1919
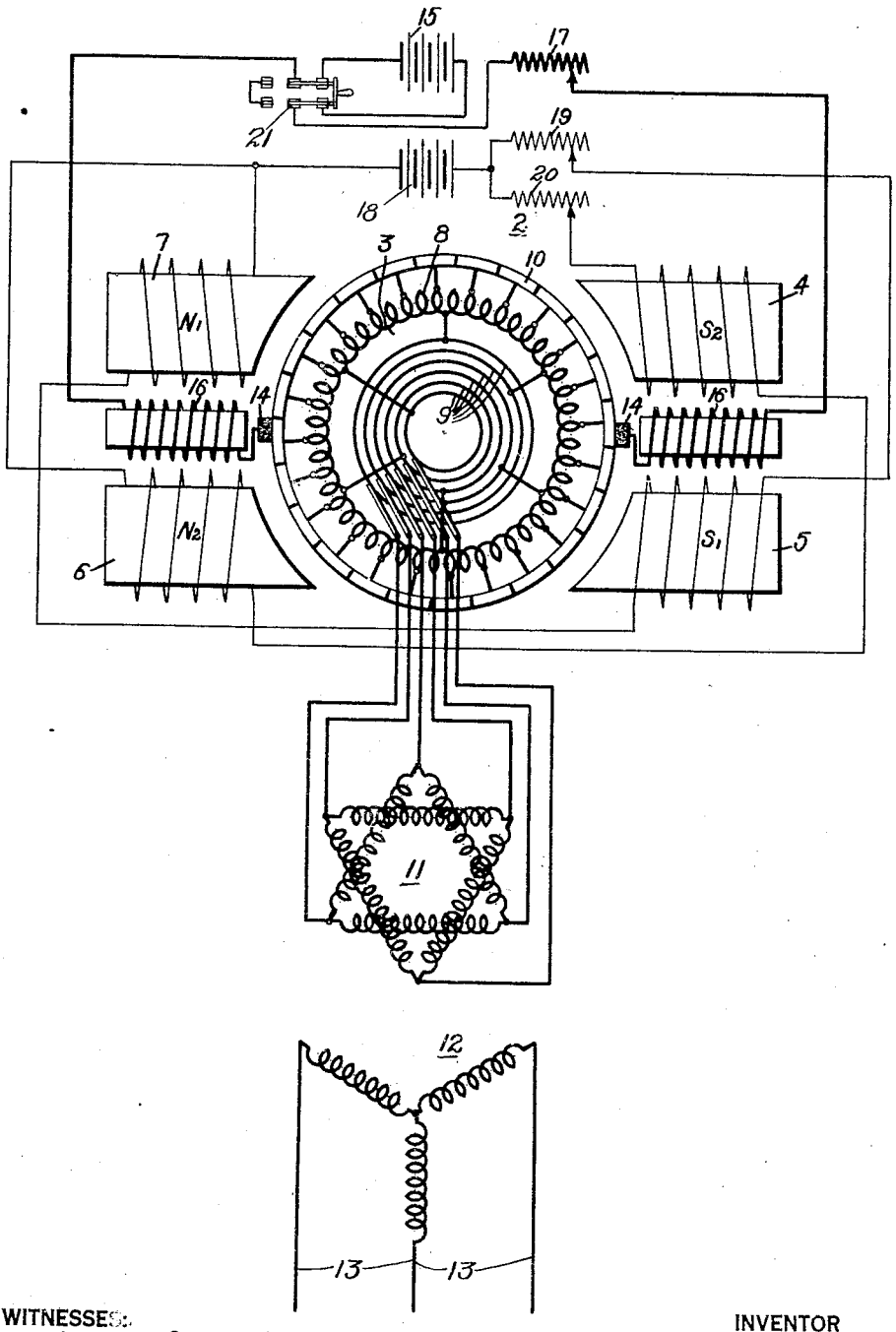
WITNESSES:
J. A. Helsel.
D. C. Davis
INVENTOR
Joseph Slepian.
BY
Wesley G. Carr
ATTORNEY Patented Feb. 17, 1925.

1,526,382

UNITED STATES PATENT OFFICE.

JOSEPH SLEPIAN, OF PITTSBURGH, PENNSYLVANIA, ASSIGNOR TO WESTINGHOUSE ELECTRIC & MANUFACTURING COMPANY, A CORPORATION OF PENNSYLVANIA.

SYNCHRONOUS DYNAMO-ELECTRIC MACHINERY.

Application filed April 4, 1919. Serial No. 287,601.

*To all whom it may concern:*

Be it known that I, JOSEPH SLEPIAN, a citizen of the United States, and a resident of Pittsburgh, in the county of Allegheny and State of Pennsylvania, have invented a new and useful Improvement in Synchronous Dynamo-Electric Machinery, of which the following is a specification.

My invention relates to synchronous dynamo-electric machines, such, for example, as synchronous condensers and rotary converters, and it has for its object to provide means whereby machines of the character designated may be enabled to correct lagging power-factor, in a system, with a maximum of efficiency and effectiveness.

The single figure of the accompanying drawing is a diagrammatic view of a dynamo-electric machine, together with associated supply and exciting circuits, embodying a preferred form of my invention.

In the operation of the ordinary synchronous dynamo-electric machine, the field is over-excited for the neutralization of lagging currents in the circuit. By its inductive action, the excess field current sets up wattless currents in the armature member which tend to neutralize the lagging wattless currents caused by line reactance. While this action is satisfactory in its correction of the power-factor, it is nevertheless slightly uneconomical in that currents flow in both the field and the armature windings, with consequent heat losses.

I find that the excess exciting currents may be supplied to the armature member by appropriate means for the production of a unidirectional field therein, the resultant exciting currents tending to flow in the armature winding being substantially equal and opposite to the wattless currents tending to flow therein from the main circuit. As a result, there is current neutralization in the armature conductors and a resultant decrease in the net current flow, with attendant decrease in the heating losses.

Referring to the drawing for a more detailed understanding of my invention, I show a dynamo-electric machine at 2 comprising an armature 3 of the rotating type and field poles 4, 5, 6 and 7.

The armature 3 is provided with a winding 8 tapped to suitable slip rings 9 and to the segments of a commutator member 10. The slip rings 9 are connected, through suitable brushes, to a polyphase source 11, shown as the secondary windings of a supply transformer 12 connected to polyphase mains 13. Brushes 14—14 bear on the segments of the commutator member 60 and are connected to a direct-current source 15 through commutating field windings 16—16 and a current-adjusting device 17.

The field poles 4 and 5 are disposed at the respective sides of one of the commutating poles 16 and are so excited, from a source 18, that they tend to produce a flux in the same direction, together constituting a field pole of a given polarity, with the commutating pole 16 projecting through the center thereof.

In like manner, the exciting poles 6 and 7 are disposed on opposite sides of the other commutating poles 16 and together constitute an exciting pole of the other polarity. The pole pieces 5 and 7, which are the trailing horns of the field poles, assuming clockwise rotation, are connected in the same circuit from the source 18 through a current-adjusting device 19 and, in like manner, the field poles 4 and 6, constituting the leading pole horns are connected in another circuit from the source 18 through a current-adjusting device 20.

Having thus described the arrangement of a synchronous condenser embodying my invention, the operation thereof is as follows. Assuming that the device is started in operation in a well known manner and that the field poles 4, 5, 6 and 7 are equally excited, the machine runs as a synchronous motor, the excitation of the field poles 4, 5, 6 and 7 being such as would ordinarily be employed with operation upon a unity-power-factor circuit without the generation of wattless currents. Current is now supplied from the source 15 to the brushes 14 to establish a unidirectional magnetic field in the armature 3, this field being in substantial alinement with that produced by the field poles 4, 5, 6 and 7. This current is conveyed to the armature with suitable commutation by virtue of the action of the commutating poles 16—16.

The cutting of the armature-induced field by the armature conductors tends to generate currents therein to neutralize the lagging currents due to the inductive power-factor of the supply system, but the flow of these currents is substantially equal and opposite to that established in the winding 8 from the brushes 14—14 and this resultant current neutralization reduces the heating within the armature winding 8 from the value it would assume if the over-excitation were supplied to the field poles and the currents induced thereby were permitted to freely circulate in the armature winding.

By eliminating the source 15—15 from the circuit connecting the brushes 14—14, as by means of a double-pole, double-throw switch 21, for instance, and by producing a different degree of excitation in the field poles 5 and 7 from that which obtains in the field poles 4 and 6, the effective axis of the main exciting field may be slightly rotated and a component of this field established of such a nature that, when cut by the armature conductors, produces a circulating flow through the brushes 14—14 and the external circuit therebetween. This current flow establishes the unidirectional magnetic field in the armature member for the production of the desired corrective action without the use of a distinct source 15 of over-excitation currents.

While I have shown my invention as applied to a synchronous condenser, it is equally applicable to use with a rotary-converter, the only difference being that suitable brushes are employed for the derivation of the direct-load currents.

While I have shown my invention in its preferred form, it will be obvious to those skilled in the art that it is not so limited but is susceptible of various minor changes and modifications without departing from the spirit thereof and I desire, therefore, that only such limitations be placed thereupon as are imposed by the prior art or are specifically set forth in the appended claims.

I claim as my invention:

1. The combination with an alternating-current line, of a synchronous dynamo-electric machine, said machine having an armature winding connected across said line, a field winding, means for energizing said field winding to a degree corresponding to unity power-factor operation of said synchronous machine, a commutator cylinder associated with said armature winding, closed-circuited brushes associated with said commutator cylinder, and means for establishing in said closed-circuited brushes and in said armature winding a current-flow corresponding to the wattless current flowing between said synchronous machine and said line.

2. The combination with a dynamo-electric machine of the synchronous type embodying a field member and armature windings, of means for furnishing excitation to the field member for unity power-factor operation of said machine and means for so circulating current in the armature winding, independently of any excitation of said field member, as to cause said machine to carry wattless currents.

3. The combination with a synchronous dynamo-electric machine having an armature winding and a field winding, of a commutator cylinder and brushes associated with said armature winding, there being relative synchronous movement between said winding and the brushes of said commutator, means for exciting said field winding to a degree corresponding to unity power-factor operation, and means for supplying unidirectional exciting current to said brushes, whereby a magnetic field is produced in said armature winding substantially in alignment with the magnetic field produced by said field winding.

4. The combination with a synchronous dynamo-electric machine having an armature winding and a field winding, of a commutator cylinder and brushes associated therewith, there being relative synchronous movement between said winding and the brushes of said commutator, means for exciting said field winding to a degree approximating unity power-factor conditions, means interconnecting the brushes of said commutator, the axis of said brushes being slightly displaced relative to the axis of the field produced by said field winding, whereby current flow is induced between said brushes and a resultant exciting field produced in said armature winding, said resultant field corresponding to the change from unity power-factor excitation necessary to produce a predetermined wattless-current flow in said machine.

5. The combination with an alternating-current line, of a synchronous dynamo-electric machine, said machine having an armature winding connected across said line, a commutator cylinder associated with said armature winding, closed-circuited brushes associated with said commutator cylinder, a pair of separate field windings adapted to produce trailing and leading pole-portions respectively on opposite sides of said brushes, and means for varying the ratio between the currents in said separate field windings.

6. A synchronous dynamo-electric machine adapted to carry wattless currents and having an armature winding, a commutator cylinder for said armature winding, closed-circuited brushes bearing on said commutator cylinder, and means for causing said brushes to introduce, into said armature winding, a current corresponding substantially to the wattless currents of the machine.

7. A synchronous dynamo-electric machine adapted to carry wattless currents and comprising a field winding exciting means for producing excitation approximating unity power-factor conditions, an armature winding, a commutator cylinder for said armature winding, closed-circuited brushes bearing on said commutator cylinder, and means for causing said brushes to carry currents causing the flow of wattless currents in said armature winding and substantially neutralizing the heating effects thereof in said armature winding.

8. The combination with an alternating-current transmission line and a dynamo-electric machine of the synchronous type having an armature connected to said transmission line and a field member, of means for so circulating currents in said armature, independently of any excitation of said field member, as to control the wattless currents flowing between said armature and said transmission line.

In testimony whereof, I have hereunto subscribed my name this 25th day of March 1919.

JOSEPH SLEPIAN.